Nov. 4, 1952 E. H. LAND 2,616,805
PHOTOGRAPHIC FILM ASSEMBLY COMPRISING A PHOTOSENSITIVE
LAYER AND ANOTHER LAYER HINGEDLY CONNECTED TOGETHER
Filed Feb. 21, 1946 2 SHEETS—SHEET 1

INVENTOR.
Edwin H. Land
BY Donald L. Brown
Attorney

Nov. 4, 1952     E. H. LAND     2,616,805
PHOTOGRAPHIC FILM ASSEMBLY COMPRISING A PHOTOSENSITIVE
LAYER AND ANOTHER LAYER HINGEDLY CONNECTED TOGETHER
Filed Feb. 21, 1946     2 SHEETS—SHEET 2

INVENTOR.
Edwin H. Land
BY Donald L. Brown
Attorney

Patented Nov. 4, 1952

2,616,805

UNITED STATES PATENT OFFICE 2,616,805

PHOTOGRAPHIC FILM ASSEMBLY COMPRISING A PHOTOSENSITIVE LAYER AND ANOTHER LAYER HINGEDLY CONNECTED TOGETHER

Edwin H. Land, Cambridge, Mass., assignor to Polaroid Corporation, Cambridge, Mass., a corporation of Delaware Application February 21, 1946, Serial No. 649,154

22 Claims. (Cl. 95—8)

This invention relates to photography, and more particularly, to novel, composite photographic films.

One object of the present invention is to provide a composite, photographic film unit comprising a photosensitive layer and an image-carrying layer, said film unit having stored within its confines the energy necessary to cause a movement of one portion of the film unit with respect to another portion thereof and to allow exposure of the photosensitive layer to actinic light, said film unit also containing a liquid composition releasable during processing of said film and capable of preventing a further storage of energy in said film unit.

Another object of the present invention is to provide a film unit comprising a photosensitive layer and an image-carrying layer which is operatively associated with said photosensitive layer, the layers of said film unit being adapted in one position to have a closed position and in another position to have an open position, said image-carrying layer in the closed position of said film unit acting to intercept light travelling in the direction of the surface of said photosensitive layer nearest said image-carrying layer, said film unit being so constructed and arranged that one of said layers may be displaced from the closed position thereof to the open position by forces exerted by one or more of the materials of said unit, so that actinic light may reach the photosensitive layer.

Another object of the present invention is to provide a film unit of the above type wherein the relative movement of one of said layers may be effected by forces within said layer and wherein, if desired, said forces may be made inoperative after treatment of said film unit.

Another object of the present invention is to provide a novel composite photographic film unit having a photosensitive layer and an image-carrying layer, the layers being hinged together and having means within the film unit for causing movement of one of said layers with respect to the other of said layers to permit exposure of the photosensitive layer to actinic light, said film unit also having means therein for containing a liquid composition utilized in processing said film.

Another object of the invention is to provide a composite film unit of the type described above wherein the moving means will cause relative separation of the two layers and, after subsequent treatment of said film unit, be incapable of causing a separation of said layers.

Still another object of the present invention is to provide a film unit of the type described above, wherein the moving means will act once to separate said layers and will, as a result of its action of separating said layers, be incapable of again separating said layers.

Still another object is to provide a novel film unit of the above type wherein the means for effecting relative displacement of the light-intercepting layer and the photosensitive layer are of a type which are rendered permanently inoperative during the processing of the film unit after the exposure of the photosensitive layer.

Still another object of the present invention is to provide a novel film unit comprising a light-intercepting layer which is subject to internal forces tending to maintain the same in a position permitting exposure of the photosensitive layer and which must be held by forces applied externally thereof in its light-intercepting position.

Still another object is to provide a novel film pack comprising as an element thereof one of the above-described units, said film pack incorporating means for maintaining said light-intercepting layer in stressed light-intercepting position.

Still another object of the present invention is to provide a novel film unit comprising a light-intercepting layer of the above type for releasing the stresses normally biasing said layer into non-light-intercepting position and which is adapted to have the stresses thereof relieved by the processing of the film unit subsequent to the exposure of the photosensitive layer.

Still another object of the present invention is to provide a film unit of the type described, wherein the outside layers of the film unit are opaque to light and wherein, after the layers have been rejoined by the processing of the film, said layers will form a light-tight covering for the interior of the film unit.

These and other objects of the invention will in part be obvious and will in part appear hereinafter.

For a fuller understanding of the nature and objects of the invention reference should be had to the following detailed description taken in connection with the accompanying drawings, wherein.

This application relates generally to film units of the type described in my copending application Serial No. 594,892, filed May 21, 1945 for Photographic Product, Process and Apparatus. Disclosures of other related subject matter also appear in my Patent No. 2,543,181, issued February 27, 1951, for "Photographic Product Comprising a Rupturable Container Carrying a Photographic Processing Liquid." The invention is, however, not limited to the particular products or processes described in the above-mentioned copending application and said patent.

This invention involves generally the production of a film unit that has stored within its confines the energy necessary to cause a movement of one part of the film unit with respect to another part to allow the exposure of a photosensitive layer carried by the film unit. In one preferred form of the invention there is provided a photosensitive layer and another layer, and in the preferred form, the latter layer is so constructed that it will, in an unstressed position, be curled upon itself. In normal use, however, this layer is held in an uncurled position, thereby being under a considerable stress which tends to recurl the layer. In a preferred use of the present invention the prestressed layer acts as an image-carrying layer.

Between this image-carrying layer and the photosensitive layer there is positioned a rupturable container, or pod, having therein a fluid such as a liquid composition, or reagent. This liquid composition is preferably viscous and preferably contains therein a developer and a film-forming material. The liquid composition also preferably contains a substance which will react with the unexposed portions of the photosensitive layer to form therewith soluble positive image-forming complexes. When the container is ruptured, such as by putting the film unit through a wringer, the viscous liquid developing composition is spread between the photosensitive layer and the image-carrying layer, where it will form an image-receiving layer. This image-receiving layer is created by the action of the film-forming substance which, during the processing of the composite film, is converted from a fluid to a solid. The positive image-forming complexes are transferred from the photosensitive layer to the image-receiving layer where the positive image is formed. In one modification of the above-described invention, the photosensitive layer may be stripped from the image-receiving layer to reveal the finished positive image.

Figures 1, 2:
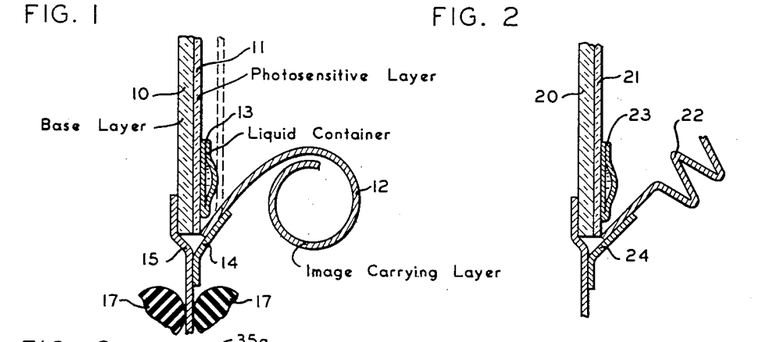
Figure 1 is a partial cross-sectional schematic view of a photographic film embodying one feature of the present invention.
Figure 2 is a partial sectional view of a modification of the invention.

Referring now to Figure 1, there is shown a novel composite film embodying the present invention having a base layer 10 and a photosensitive layer 11. There is also provided an image-carrying layer 12 and a container 13 for a liquid composition. The container 13 is shown for convenience as being attached to the photosensitive layer 11, but may be attached to the image-carrying layer 12. The image-carrying layer 12 is shown as being attached to the photosensitive layer assembly, i. e., layer 10 and 11, by means of a hinge 14. The lower portion of hinge 14 is preferably extended and constitutes a connecting means 15. This connecting means may be part of a strip that joins adjacent film units for the purpose of permitting one film unit to be drawn into exposure and processing position by the preceding film unit, or it may be merely a leader if the film units are not inter-connected. As shown, this strip 15 extends between a pair of pressure rolls 17. This connecting strip ordinarily runs from the top of one film unit to the bottom of the following film unit and when the first film unit is pulled through the pressure rolls, the connecting strip 15 will also be pulled through the pressure rolls and will act to position the next film unit for exposure. It is, of course, obvious that layer 12 may be attached directly to layer 10 or the ends of layers 12 and 10 may be extended and attached by suitable means such as an adhesive. Layer 12 is shown as being coiled upon itself, and this is the position which it will assume if no restraining force is applied thereto. In other words, it is prestressed so that it tends to roll upon itself. This prestressing can be accomplished in numerous ways depending upon the material from which the layer is made.

The base layer 10 is preferably made of an opaque substance such as paper, baryta paper being most preferred, although other materials can be used like a cellulosic film base such as cellulose acetate, cellulose nitrate or cellulose acetate butyrate, which has been treated so as to be opaque to actinic light. In some cases it is desirable for base 10 to be transparent and, in these cases, the cellulosic film bases are preferred. The photosensitive layer 11 preferably comprises an emulsion of a silver halide or of a mixture of silver halides or of a mixed silver halide. The photosensitive layer may, however, comprise other photosensitive materials such as dichromates, diazo compounds or ferric salts. These latter materials are preferred in some specialized uses of the present invention.

There are several known ways in which a diazonium salt layer may be exposed and developed to produce a relatively stable image. In each of these processes the treatment of the photosensitive diazonium layer may be accomplished by applying thereto a liquid containing certain developing reagents. (L. P. Clerc, "Photography Theory and Practice," second edition, published 1937 by Pitman Publishing Company, page 444, paragraph 693.) It is also well known that certain ferric salts of organic acids, for example the oxalates, tartrates, and citrates, are reduced to ferrous salts when exposed to light. (L. B. Clerc, "Photography Theory and Practice," second edition, published 1937 by Pitman Publishing Company, page 402, paragraph 621 et seq.; Crowley Patents Nos. 2,093,421, 2,113,423, 2,130,070, 2,130,071, 2,137,015.) A considerable number of photographic processes depend for their functioning on this photochemical phenomena. It is known in connection with these iron salts that any reagent that will differentiate between ferric and ferrous salts can be used to develop the barely visible image formed by the photochemical reduction of the ferric salt into an image which is very easily visible. With regard to the dichromates, a number of feasible processes, dependent upon the selective hardening of dichromated colloids, are described in chapters 25 and 26 of Freedman, "History of Color Photography," published 1944 by the American Photographic Publishing Company, Boston.

The liquid composition in the container 13 preferably comprises a developer such as hydroquinone, a film-forming substance such as sodium carboxy-methyl cellulose and a substance adapted to form from a latent photosensitive image, positive image-forming components. This latter substance in a preferred form of the invention is sodium thiosulfate. There may also be included in this liquid composition other substances such as a preservative and an alkali, and water to carry all of the above-named substances in solution. The container 13 is preferably formed of a substance, such as an oxygen and water-vapor impervious material, such, for example, as a sheet of wax-impregnated metal-coated paper, wax-coated metal foil, or a metal foil coated with a resin, such as polyvinyl butyral, which is inert to alkalies.

The image-carrying layer 12 can be made of a fibrous material such as paper, including alpha and baryta paper, which, when wetted, rolled upon itself and subsequently dried, will take a permanent set in the position assumed at the completion of drying. Or it might be formed of gelatin which has been hardened when it is in a curled-up position. It is also possible that the image-carrying layer could be partially formed of a water soluble substance such as a starch or sodium carboxymethyl cellulose. Numerous other materials and processes will be obvious to those skilled in the art, so it is not necessary to recite them here.

When the film unit of the type shown in Fig. 1 is mounted in a camera or is ordinarily handled in daylight, the image-carrying layer 12 is preferably held in the position shown by the dotted lines by suitable restraining means, to be more fully described hereinafter. When the layer 12 is in this position, it has a tendency to move from the dotted line position to the full line position. When the restraining means are removed and the layer 12 is permitted to move in accordance with the forces therewithin, it will curl up upon itself and leave the photosensitive layer 11 free for exposure to actinic light.

In the use of the film unit as shown in Fig. 1, the unit is mounted in a camera over pressure rollers 17 and the photosensitive layer is ready for exposure to actinic light. After exposure the pressure rolls are rotated and the film is drawn through the pressure rollers by the connecting strip 15. The container 13 is ruptured to release the liquid composition, and the image-carrying layer 12 is uncurled either by the action of the pressure rollers or by any other suitable means which serve an uncurling function as the curled layer is pulled therepast. The liquid composition develops the latent photosensitive image, forms an image-receiving film and transfers image-forming components from the photosensitive layer to the formed film. It also permeates the image-carrying layer 12. If this image-carrying layer is made of a substance such as paper, and if the liquid composition contains a substance such as water, the stress within the paper is released by the action of the water upon the fibers of the paper, and, as the film unit passes through the rollers, the wet paper of the image-carrying layer 12 is ironed flat and will maintain its flat position even after drying. An important step in the process is the action of the liquid in the composition which relieves the stresses within the image-carrying layer so that said layer will not thereafter tend to curl upon itself.

Since the image-carrying layer 12 is preferably opaque and since the base layer 10 is also preferably opaque these two layers form a light-tight covering for the photosensitive layer and the formed image-receiving layer. The development and image-forming reactions can thus take place free from light even though the film unit as a whole is in daylight.

There is thus provided a film having within its confines all of the substances necessary to produce a finished positive image and the film can be mounted in a camera so that the removal of one frame of the film will allow the next frame to be in position for exposure to actinic light. After exposure the film is processed by passing it through pressure rollers, and ejected from the camera into daylight.

Referring now to Fig. 2, there is shown another modification of my invention, wherein a light excluding layer is provided which is prestressed in such a manner that it tends to collapse upon itself in an accordion pleated fashion. This modification of the invention can be used in the manner as discussed in connection with Fig. 1, i. e., so that it is normally in a light excluding, stressed position. However, this modification of the invention has the added advantage that it may be stored in a film pack in the unstressed position, being collapsed upon itself. In this position, due to the nature of the layer, it will be folded flat against only the lower edge of the photosensitive layer and will not add any appreciable thickness to the film unit in this position. This layer is also capable of having its stressed condition relieved by the normal processing of the film unit.

There is provided a base layer 20, carrying thereon a photosensitive layer 21, an image-carrying layer 22, a container 23 for a liquid composition and a hinge or connecting means 24. These parts correspond generally to like parts discussed in connection with Fig. 1. The image-carrying layer 22 is shown as an accordion pleated layer adapted to collapse upon itself and is partially collapsed in Fig. 2. This film unit may be stored in a film pack with the layer 22 completely collapsed upon itself. This will allow the exposure of the photosensitive layer to actinic light.

In the use of the invention of the film unit shown in Fig. 2, after the photosensitive layer has been exposed, the film unit is run through means such as a pair of pressure rollers, which will rupture the container 23 and will iron the image-carrying layer 22 flat against the photosensitive layer 21.

Figure 3:
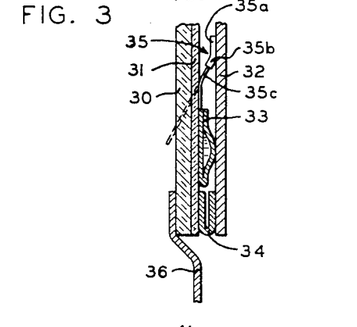
Figure 3 is a partial sectional view of another modification of the invention.

Referring now to Fig. 3, there is shown still another modification of the invention wherein there is provided a means separate from either layer of the composite film which will tend to cause a movement of one layer of the film unit with respect to another layer, so as to allow exposure of the photosensitive layer. In this modification of the invention, a preferred embodiment contemplates the use of a spring means for opening the film unit to allow exposure of the photosensitive layer. Preferably this spring means is so constructed that, when the film unit is processed, the spring means is rendered inoperative to again open the film unit. In this figure, 30 is a base layer, 31 is a photosensitive layer, and 32 is an image-carrying layer. As in the previous modifications, there is preferably included a container 33 for a liquid composition, and a connecting or hinge means 34 joining layer 32 with the other layers. In addition to the elements described above, there is also shown a spring means 35 attached to the image-carrying layer 32. This spring means comprises the flat rigid portion 35a adapted to be secured to the image-carrying layer 32, and a curved rigid portion 35b which has attached thereto another flexible portion 35c. Portions 35a and 35b are preferably made of a frangible material such as glass or polystyrene, which is adapted to be fractured by passage through pressure rollers. The portion 35c, in an unstressed position would be straight as shown by the dotted line. When this portion is in the position as shown by the full line, it is considerably stressed and tends to separate the image-carrying layer 32 and the photosensitive layer 31. The image-carrying layer 32 is preferably made comparatively stiff so that a moving force exerted thereon by the spring means 35 will move the whole layer and not just a portion thereof. In the use of the modification of the invention shown in Fig. 3, it is preferably mounted in a film pack so that the photosensitive layer is in the focal plane of the camera, and the layer 32 is held in the position shown by the full lines in Fig. 3. When the holding means are released, the spring means 35 forces the image-carrying layer 32 away from the photosensitive layer 31, thus allowing the latter to be exposed to actinic light. The photosensitive layer 31 is then exposed to actinic light and the whole unit is run through compression means such as a pair of pressure rollers. As the film unit passes through the pressure rollers the container is ruptured to release the liquid composition therein, carrying out the above-described photographic developing and image-forming processes. As the spring means 35 passes through the pressure rollers, the frangible portion thereof is broken which makes the spring means inoperative to further separate the layer 32 from the layer 31, and the layers may be held in permanent relationship to each other thereafter until such time as it is desired to separate the layers to reveal the final positive image.

It is also possible to make the member 35 in such a way that the angular portion 35b can be secured to the portion 35a of the member 35 by means of an adhesive which is dissolved by one of the liquids contained in the liquid composition. It is also possible to make both rigid portions 35a and 35b out of a substance which is soluble in one of the liquids contained in the liquid composition. If such be the case, as the liquid composition reaches the soluble portions of the members 35a and 35b, it dissolves these portions and thereby removes from the member 35 its ability to further act as a spring element and the member 35 does not tend to re-separate the layer 32 from the layer 31 after the film unit has passed through the pressure rollers.

Figure 3A:
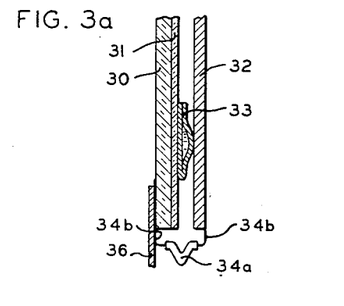
Figure 3a is a partial sectional view of another modification of the invention shown in Fig. 3.

Referring now to Fig. 3a, there is shown still another modification of the present invention. In this modification, a spring means is provided for opening the film unit and it is so arranged and constructed that it has sufficient strength to move either layer and hold said layer positively in its new position. By this modification either layer may be moved 90° or more, and if the photosensitive layer is moved, it may be moved to the focal plane of a camera where it will be held firmly in position by the spring means. As shown in this figure, there is provided, as in Fig. 3, a base layer 30, a photosensitive layer 31, and an image-carrying layer 32, which correspond to like parts in Fig. 3. There is also provided a connecting means 36. In place of the hinge 34 of Fig. 3, there is substituted a three-piece hinge comprising a central portion 34a and two side portions 34b. This hinge acts as a separating means as well as a hinge and is suitably attached to the various layers. Portion 34a of the hinge is made of a frangible substance such as glass, and has a bent central portion adapted to aid in the fracture thereof when it passes through the pressure means such as pressure rollers. Extending from each side of the central portion 34a are two spring elements 34b. As can be seen, both of these spring elements are bent at 90° to put them under considerable stress, this stress tending to open the film unit out flat.

In the operation of the film unit shown in Fig. 3a, when the image-carrying layer 32 is released by holding means, both spring elements 34b will exert a force on layer 32, tending to move it from its position shown, through 180° to a position in a plane parallel with the plane of the photosensitive layer 31. It is quite probable that the camera in which such a film unit is used will not require a 180° rotation of the layer 32, but the additional separating force inherent in the construction of the hinge and separating means will firmly hold the image-carrying layer 32 in the separated position. When the film is pulled through the pressure rollers after exposure, the portion 34a of the hinge is broken and it will be ineffective to enable the spring elements 34b to exert any separating force to the layers 32 and 31.

Since the combination spring and hinge means 34a—34b can have a relatively strong spring action, it is possible to use the film unit of Fig. 3a in a horizontal film pack where the photosensitive layer assembly 30—31 is on the top. In this case the spring and hinge means 34a—34b swings the photosensitive layer assembly from a horizontal position upwardly to a vertical position to allow exposure of the photosensitive layer. If this is done, it is preferable to place the container 33 on the layer 32 so that the spring does not have to lift the weight of the container.

Figure 4:
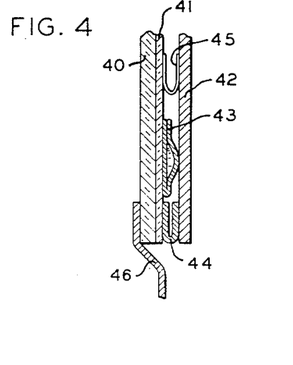
Figure 4 is a partial sectional view of still another modification of the invention.

Referring now to Fig. 4, there is shown another modification of the present invention wherein there is employed a moving means which, as the result of its movement of the layers, becomes inoperative to cause a further movement. In the preferred embodiment, the moving means constitutes a spring means which, after exerting its force to separate the two layers of the film, can no longer act to cause a further separation when the layers are rejoined. As in Fig. 3, the film unit of Fig. 4 preferably comprises a base layer 40, a photosensitive layer 41, an image-carrying layer 42, a container 43, a hinge 44, and a connecting means 46. The materials from which these various layers and elements can be made correspond to like elements discussed in connection with Fig. 3 above. In addition to the various elements of the film unit of Fig. 4 mentioned above, there is also provided a spring means 45 for separating the image-carrying layer 42 from the photosensitive layer assembly to allow direct exposure of the photosensitive layer. This spring means 45 preferably comprises a straight piece of a springy substance such as a thin strip of spring steel, which, in its unstressed position, lies in a plane. Preferably there are two of these spring elements per film unit and they are placed on the edges of the photosensitive layer with one surface of one end of the spring element adhesively secured to the image-carrying layer. As shown in Fig. 4, that portion of the spring element 45 which is not secured to the layer 42 has been bent back upon itself to form a U, thus placing the spring element under a considerable stress. It can be seen that one side of the U of the spring element will tend to move from the position shown to a position in the plane of the other side of the U, said plane being parallel to the plane of the layer 42.

In the operation of the film unit shown in Fig. 4, the film unit is positioned in the camera and the image-carrying layer 42 is released so as to allow the spring element 45 to separate said layer 42 from the photosensitive layer assembly. When the image-carrying layer has been separated by the spring element, the spring is free to straighten out and its whole extent will lie in a single plane. When the image-carrying layer 42 and the photosensitive layer 41 are rejoined as the film unit passes through pressure roller or other pressure means, the spring element 45 lies wholly within a plane parallel to said two layers and will not thereafter tend to separate said layers.

Figure 4A:
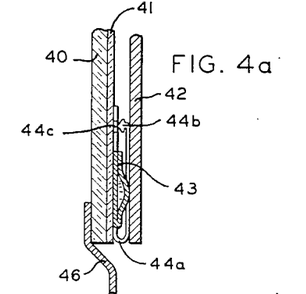
Figure 4a is a partial sectional view of another modification of the invention shown in Fig. 4.

Referring now to Fig. 4a, there is shown another modification of the invention, wherein a means is provided for causing a relative movement of two of the layers of a film unit, the means being rendered inoperative to cause a further movement as the result of bringing the layers back to their original position. This means preferably constitutes a spring means which is so constructed that it can be made inactive without being fractured. As can be seen by reference to Fig. 4a, there is provided the usual base layer 40, the photosensitive layer 41, an image-carrying layer 42, a container 43 and connecting means 46. In place of the hinge 44 of Fig. 4, there is shown a U-shaped spring element 44a which acts both as a hinge and as a separating means for the various layers. In an unstressed position, the hinge element 44a will lie in a single plane parallel to the planes of the various layers of the film unit, and in the position shown in Fig. 4a, the spring element is under considerable stress. As shown, one end of the U-shaped spring element has provided therein a hole 44c, and the other end of the U-shaped element has a spear-shaped protrusion 44b of slightly larger diameter than the hole 44c. In the preferred modification of the invention, the spring element 44a and the protrusion 44b are formed of a substance such as spring steel.

As can be readily understood by examining Fig. 4a, the hinge and spring element 44a separates the image-carrying layer 42 from the photosensitive layer assembly whenever the layer 42 is released for movement. When the layer 42 is subsequently pressed into close relationship with the layer 41, as occurs in the operation of the film unit by passing said film unit through pressure rollers, the protrusion 44b is forced through the hole 44c and the two ends of the U-shaped spring element are locked together, thereby preventing any subsequent tendency for the arms of the U to separate.

The hinge and spring element 44a can be made sufficiently strong so as to lift the photosensitive layer assembly from a horizontal position in a film pack to a vertical position, thus allowing exposure of the photosensitive layer. This feature of the invention is desirable in those instances where it is preferable to use a horizontal film pack with the photosensitive layer assembly on the top of the pack.

Figure 5:
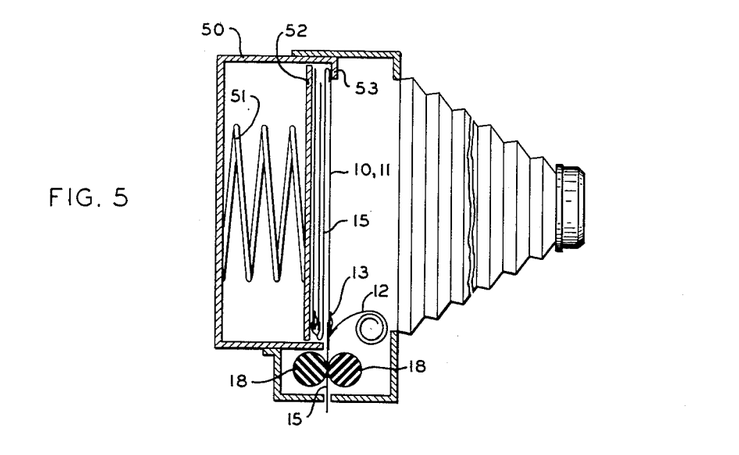
Figure 5 is a partial schematic sectional view of a film pack made up of a number of film units such as shown in Fig. 1.

Referring now to Fig. 5, there is shown a sectional schematic view of a number of film units of the general type described above wherein the film unit contains within itself the necessary forces for causing a relative movement of one of the layers with respect to another layer of each film unit and the film pack has means normally restraining these forces. In this figure, the film units are shown as being of the type described in Fig. 1, mounted in a film pack in operative relationship within a camera. As shown, the film pack comprises a casing 50 having in the rear portion thereof a spring 51 and a pressure plate 52 adapted to transmit a uniform pressure to all of the film units within the film pack. For simplicity of description the film units are shown in a position somewhat displaced from one another, and only two film units are shown in the pack. As can be seen, the first film unit, i. e. the right-hand one in Fig. 5, has been moved to a position coinciding with the focal plane of the camera by means of the force exerted on the film units within the pack by the spring 51. The portion 53 of the casing 50 is shown diagrammatically as holding the photosensitive layer assembly within the focal plane. This portion 53 extends downwardly a sufficient distance so that it will act as a rigid support for the photosensitive layer assembly, but it does not extend far enough so that it will engage the top end of the layer 12. Therefore, as a film unit comes to the front of the film pack, the top edge of the layer 12 of that unit will be free to curl upon itself to thereby expose the photosensitive layer.

As can be seen by an examination of Fig. 5, the prestressed layer 12 of the second film unit is held in its extended position due to the pressure of the spring and the fact that the layer 10—11 of the preceding layer acts to hold the layer 12 against its own photosensitive layer assembly. There is also shown as connecting the two film units a connecting means 15 similar to that shown in my above-mentioned copending application. As can be seen from Fig. 5, the connecting means runs from the top back side of the first film unit to the lower back side of the following film unit. Thus, as the first film unit is pulled through the pressure rollers, the second film unit will be pulled into position over the pressure rollers by means of the connecting strip 15 and will be in a position to be removed from the camera by means of connecting strip 15 after the photosensitive layer has been exposed.

In one form of the holding means 53, it is extended downwardly to a position below that shown in Fig. 5. In this modification of the invention, it is necessary for the whole film unit to be moved downwardly in order to release the top end of the layer 12 from the holding means. With this modification the connecting strip serves the function of moving this film unit downwardly.

In order to permit loading of the film pack arrangement of Fig. 5 in daylight, a relatively stiff opaque cover sheet would be provided for the front of the housing 50. This cover sheet would have one end placed between the pressure rollers 18 and would have the other end joined to the first film unit by a connecting means similar to that shown at 15 in Fig. 5.

Figure 6:
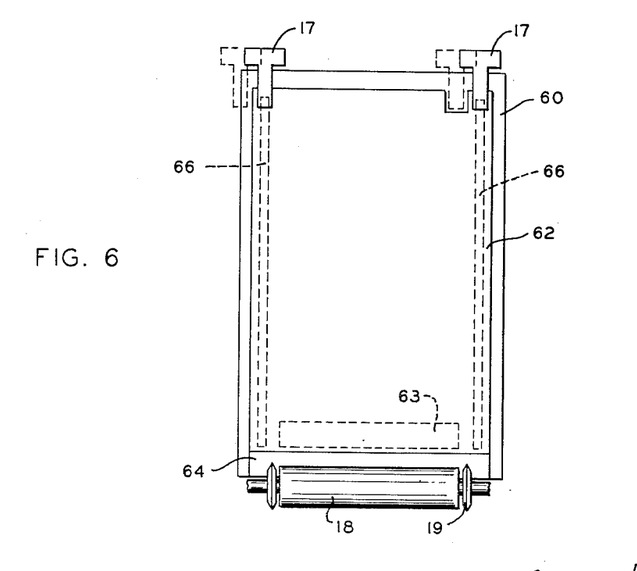
Figure 6 is a partially schematic view of a photographic film embodying a modification of the inventions shown in Figs. 1 and 2.

Referring now to Fig. 6, there is shown a modification of the invention wherein means are provided in a camera for making inoperative a means contained in a film unit of a film pack for causing relative movement of one portion of a film unit with respect to another portion of a film unit. The means in the camera renders said moving means inoperative in the course of processing said film after exposure of said film unit. In the particular modification of the invention shown in Fig. 6, the camera is provided with a severing or counter-stressing means for rendering the moving means inoperative. As can be seen from an examination of Fig. 6, there is provided a base layer 60 which may have on its surface a photosensitive layer (not shown). There is also provided an image-carrying layer 62 which may be formed of a paper, such as alpha or baryta paper, or hardened gelatin or numerous other substances which are relatively deformable. There is also provided a container 63 having therein a liquid composition and a connecting means or hinge 64. For clarity, I have shown the base layer 60 as being slightly larger than the image-carrying layer 62. This merely serves to show the operation of the device a little more clearly. It should be noted that the top portion of the image-carrying layer 62 has two notches therein corresponding to two stop members 17, which are shown in dotted lines as fitting within these notches. These stop members are merely illustrative of one means of holding the film within the camera. Secured to the image-carrying layer 62, there is a separate curling means 66 which, in a preferred form of the invention, is a flat strip of spring material adhesively secured to the inner side of the image-carrying layer. Since this is the preferred position, this spring means 66 is shown in dotted lines. These spring strips 66 in their unstressed position are curled, and as shown in Fig. 6 they are in a stressed position. This stress tends to make them curl upon themselves, carrying therewith the image-carrying layer 62 and curling it within the folds of the spring 66. The stops 17, which are mounted upon the camera or the film pack, are shown in position in full lines to prevent the movement of the image-carrying layer 62. If these stops are moved to their dotted line position, they will release the image-carrying layer 62, and allow it to curl upon itself under the influence of the spring means 66. The stops in this latter position will act to hold the base layer 60, carrying the photosensitive layer, in position for exposure of the photosensitive layer.

There is also shown in Fig. 6 one pressure roller 18 of a pair. These pressure rollers are adapted to engage the film and process it in accordance with the discussion of Fig. 1 above. In addition to the pressure rollers, there is shown severing means 19, which may be rotary knife blades adapted to cut at least through the image-carrying layer 62, so as to separate the coiling means 66 from the remainder of the layer. Thus, these coiling means will not tend to recoil the image-carrying layer 62 after it has passed through the pressure means. It is, of course, obvious that other modifications could be employed in place of the severing means, such as a pair of hard serrated rollers which would deform the spring means beyond its elastic limit and thereby remove the stress therein. If such were done, the spring means, after passing through such serrated rollers, would have no tendency thereafter to recoil the image layer 62.

In connection with the above discussion of Fig. 6, a circularly coiled spring means has been shown for curling up the image layer 12 in order to reveal the photosensitive layer. It is also possible to use this concept of the invention in connection with the modification shown in Fig. 2, with the distinction that an accordion pleated spring member is substituted for the coiled spring member. In this modification of the invention, an accordion pleated spring member is secured to the inner surface of the layer 22 of Fig. 2 and causes the collapse of said layer 22 whenever a restraining force is released. As contemplated in connection with the spring member shown in Fig. 6, the accordion pleated spring member mentioned above is severed by the cutters 18 shown in Fig. 6, so that the accordion pleated spring members have no further effect upon the remainder of the image-carrying layer 22. It is also apparent that these accordion pleated spring strips can be treated by passage through serrated rolls so as to deform these strips beyond their elastic limit and thereby remove their springiness.

In the various modifications of the invention wherein a spring is incorporated as part of the film unit, it is preferred that two springs be used and that they be placed on the edges of the film unit so as not to interfere with the exposure of the photosensitive layer. This is also preferable, since the action of the spring unit might tend to scratch the photosensitive layer in an image portion thereof, if the spring is not placed at the edge of the film unit.

It is also contemplated by the present invention to adjust the adhesive qualities of the liquid composition with respect to the energy causing a separation of the layers so that the adhesion caused by the creation of the film between the layers acts to overcome the force tending to separate said layers. Further, it is contemplated to use an adhesive of such a character that its adhesion decreases after a period of time, thus allowing the reseparation of the layers.

As an example of this modification of the invention, the spring element of Fig. 4a can be modified by eliminating the protrusion 44b. In this case the liquid composition carried by the container 43 comprises a viscous film-forming material such as a solution of sodium carboxymethyl cellulose. When this liquid is spread between the image-carrying layer 42 and the photosensitive layer 41, it initially has a strong adhesion for both of said layers and, if the spring 44a is sufficiently weak, the adhesion overcomes the force of the spring tending to separate the layers. As the liquid dries and the film becomes stable, its adhesion with respect to the photosensitive layer decreases and, when the formed film is sufficiently dry, the spring 44a acts to separate the photosensitive layer and the image-carrying layer which has upon its surface the formed film containing the final image. This effect is particularly desirable, since, at the time of separation, the development and image formation is complete.

It is apparent that this modification of the invention can be applied to the invention shown in Fig. 1, for instance. In this latter case, however, it is preferable to have the liquid comprise a substance which acts to release the stress contained in the image-carrying layer 12 since the final positive image is carried by that layer in the preferred embodiment thereof. If, however, the final image is carried by the photosensitive layer, as may be the case, such a modification as mentioned above can be utilized with advantage.

In the various modifications of the invention discussed above, it is equally possible for the invention to be practiced without the use of a film-forming substance in the liquid composition. If such is the case, the final positive image is formed on the image-carrying layer rather than within an image-receiving layer formed as the result of the treatment of the composite film unit.

It is preferred in the present invention to make both the image-carrying layer and the base layer shown in the various film units of an opaque material so that the film unit as discharged from the camera by the pressure rollers or other suitable means is in a light-tight condition. This feature of the invention is not controlling, however, since it is possible to provide within the camera itself a light-tight chamber wherein the developing process may be carried out after the film unit has been run through the pressure rollers. In this case, either or both of the outer layers could be transparent.

In the various figures of the drawings, the components of the photographic material of the present invention have been shown as separate, distinct, and relatively thick layers. It should be understood that the relative thickness of these layers is shown only for illustrative purposes to clarify the invention. In actual practice some of these layers are extremely thin.

Since certain changes may be made in the above product and different embodiments of the invention could be made without departing from the scope thereof, it is intended that all matter contained in the above description or shown in the accompanying drawings shall be interpreted as illustrative and not in a limiting sense.

What is claimed is:

1. In a film unit for carrying out a photographic process, the combination which comprises a photosensitive element, including a base layer and a photosensitive layer supported on said base layer, a third layer, hinge means connecting said photosensitive element to said third layer adjacent one end of one of said layers whereby said third layer is pivotable about said hinge means from a position in superposed and generally parallel relation to said photosensitive layer to a position wherein it is angularly disposed and spread apart from said photosensitive element, and resilient means operatively engageable with a face of said photosensitive element and a face of said third layer for urging said third layer into a position wherein it is angularly disposed and spread apart from said photosensitive element, said third layer being shaped to a condition wherein at least a part thereof, beginning at the end of the third layer most distant from said hinge means, is overturned upon itself, and said third layer comprising a flexible and deformable material whereby it is normally urged into its overturned condition and is yieldable under stress to be moved into superposed relation with said photosensitive layer and to return to its preshaped condition upon release of said stress, said photosensitive layer having as its photosensitive material a salt from the class consisting of (a) the photosensitive ferric salts, (b) the photosensitive diazonium salts, (c) the photosensitive dichromates, and (d) heavy metal salts capable of forming a latent image upon photo-exposure and capable of development to produce a visible image comprising the metal of said salt.

2. In a film unit as defined in claim 1, a rupturable container adapted to hold a photographic processing liquid, said container being carried within said unit in a position for releasing its liquid content upon rupture of the container between said third layer and said photosensitive layer.

3. In a film unit for carrying out a photographic transfer process, the combination which comprises a photosensitive element, including a base layer and a photosensitive layer comprising silver halide and supported on said base layer, an image-carrying layer, hinge means connecting said photosensitive element to said image-carrying layer adjacent one end of one of said layers whereby said image-carrying layer is pivotable about said hinge means from a position in superposed and generally parallel relation to said photosensitive layer to a position wherein it is angularly disposed and spread apart from said photosensitive element, and resilient means operatively engageable with a face of said photosensitive element and a face of said image-carrying layer for urging said image-carrying layer into a position wherein it is angularly disposed and spread apart from said photosensitive element, said image-carrying layer being shaped to a condition wherein at least a part thereof, beginning at the end of the image-carrying layer most distant from said hinge means, is overturned upon itself, and said image-carrying layer comprising a flexible and deformable material whereby it is normally urged into its overturned condition and is yieldable under stress to be moved into superposed relation with said photosensitive layer and to return to its preshaped condition upon release of said stress.

4. A film unit as defined in claim 3 wherein a rupturable container is carried in said unit between said image-carrying layer and said photosensitive layer and is mounted on one of said layers, said rupturable container holding a liquid processing composition which includes at least a silver halide developer.

5. In a film unit for carrying out a photographic process, the combination which comprises a photosensitive layer, a second layer, and hinge means connecting said photosensitive layer to said second layer adjacent one end of one of said layers whereby said second layer is pivotable about said hinge means from a position in superposed and generally parallel relation to said photosensitive layer to a position wherein it is angularly disposed and spread apart from said photosensitive layer, said second layer being shaped so that at least a part thereof, beginning at the end of the second layer most distant from said hinge means, is overturned upon itself, said second layer comprising a flexible and deformable material whereby it is normally urged into its overturned condition and is yieldable under stress to be moved into superposed relation with said photosensitive layer and to return to its overturned condition upon release of said stress, said photosensitive layer having as its photosensitive material a salt from the class consisting of (a) the photosensitive ferric salts, (b) the photosensitive diazonium salts, (c) the photosensitive dichromates, and (d) heavy metal salts capable of forming a laten image upon photo-exposure and capable of development to produce a visible image comprising the metal of said salt.

6. In a film unit for carrying out a photographic transfer process, the combination which comprises a photosensitive silver halide layer, an image-carrying layer, and hinge means connecting said photosensitive layer to said image-carrying layer adjacent one end of one of said layers whereby said image-carrying layer is pivotable about said hinge means from a position in superposed and generally parallel relation to said photosensitive layer to a position wherein it is angularly disposed and spread apart from said photosensitive layer, a rupturable container adapted to hold a photographic processing liquid and carried by said unit in a position to release its liquid content, upon rupture of the container, between said photosensitive and image-carrying layers, and said image-carrying layer comprising a flexible and deformable material and being shaped to a condition wherein at least a part thereof, beginning at the end of the image-carrying layer most distant from said hinge means, is overturned upon itself whereby said image-carrying layer is normally urged into its shaped condition and is yieldable under stress to be moved into said superposed relation with said photosensitive layer and, at least prior to rupture of said container, is capable of returning to its overturned condition upon release of said stress.

7. A film unit as defined in claim 6 wherein said image-carrying layer comprises a material which is wettable and which is capable of being set, on drying, in a predetermined shape to which the layer has been deformed while wet and which is releasable from said predetermined shape upon re-wetting.

8. A film unit as defined in claim 6 wherein said image-carrying layer is a paper sheet and wherein said liquid includes water.

9. In a film unit for carrying out a photographic process, the combination which comprises a photosensitive element, including a base layer and a photosensitive layer supported on said base layer, a third layer, hinge means connecting said photosensitive element to said third layer adjacent one end of one of said layers whereby said third layer is pivotable about said hinge means from a position in superposed and generally parallel relation to said element, including said photosensitive layer, to a position wherein it is angularly disposed and spread apart from said photosensitive element, and resilient means operatively engageable with a face of said photosensitive element and a face of said third layer and urging said third layer into a position wherein it is angularly disposed and spread apart from said photosensitive element, said photosensitive layer having as its photosensitive material a salt from the class consisting of (a) the photosensitive ferric salts, (b) the photosensitive diazonium salts, (c) the photosensitive dichromates, and (d) heavy metal salts capable of forming a latent image upon photo-exposure and capable of development to produce a visible image comprising the metal of said salt.

10. In a film unit for carrying out a photographic transfer process, the combination which comprises a photosensitive silver halide layer, an image-carrying layer, hinge means connecting said photosensitive layer to said image-carrying layer adjacent one end of one of said layers whereby said image-carrying layer is pivotable about said hinge means from a position in superposed and generally parallel relation to said photosensitive layer to a position wherein it is angularly disposed and spread apart from said photosensitive layer, a rupturable container adapted to hold a photographic processing liquid and carried by said unit in a position to release its liquid content, upon rupture of the container, between said photosensitive and image-carrying layers, and resilient means operatively engageable with a face of said photosensitive element and a face of said image-carrying layer and urging said image-carrying layer into a position wherein it is angularly disposed and spread apart from said photosensitive element.

11. A film unit as defined in claim 10 wherein said resilient means comprise at least one spring member which is constructed and arranged so that it is under compression when said image-carrying and photosensitive layers are in said superposed relation and so that it is rendered inoperative following the release of energy therefrom to effect movement of the image-carrying layer about its hinge means into a position wherein said photosensitive layer and said image-carrying layer are spread apart with respect to each other.

12. A photographic product which comprises, in combination, a film magazine having mounted therein at least one film unit of the character comprising a photosensitive silver halide layer, an image-carrying layer, and hinge means connecting said photosensitive layer to said image-carrying layer adjacent one end of one of said layers whereby said image-carrying layer is pivotable about said hinge means from a position in superposed and generally parallel relation to said photosensitive layer to a position wherein it is angularly disposed and spread apart from said photosensitive layer, said magazine having an exposure opening and means therein for urging said film unit into registration with said opening, said film unit being carried in said magazine so that the image-carrying layer thereof faces said exposure opening and said magazine also being provided with holding means releasably engageable with said image-carrying layer for holding said image-carrying layer in said superposed relation to said photosensitive layer, said image-carrying layer being releasable from said engagement with said holding means upon relative movement between said holding means and said film unit, said film unit also having associated therewith a rupturable container adapted to hold a photographic processing liquid and carried by said unit in a position to release its liquid content, upon rupture, between said photosensitive and image-carrying layers, and said film unit being further provided with resilient means operatively engageable with a face of said photosensitive layer and a face of said image-carrying layer and urging said image-carrying layer into a position wherein it is angularly disposed and spread apart from said photosensitive layer, said image-carrying layer comprising a flexible and deformable material and being shaped to a condition wherein at least a part thereof, beginning at the end of the image-carrying layer most distant from said hinge means, is overturned upon itself whereby said image-carrying layer is normally urged into its shaped condition and is yieldable under stress to be moved into said superposed relation with said photosensitive layer and, at least prior to rupture of said container, is capable of returning to its overturned condition upon release of said stress by release of said holding means.

13. A photographic product as defined in claim 12 wherein a plurality of film units, providing a pack, are mounted within said film magazine in superposed and contacting relation to each other with the image-carrying layer of each film unit facing the exposure opening in said magazine, said means for urging a film unit into registration with said exposure opening holding said film units in said superposed relation, each said film unit having a leader connected thereto and extending from the hinge end of said film unit, each film unit, except the film unit in register with said opening, having the free end of its leader connected to the film unit which is in superposed relation therewith on the side thereof towards said exposure opening, each said leader providing means for removing its associated film unit from said magazine.

14. A photographic product which comprises, in combination, a film magazine having mounted therein at least one film unit of the character comprising a photosensitive silver halide layer, an image-carrying layer, and hinge means connecting said photosensitive layer to said image-carrying layer adjacent one end of one of said layers whereby said image-carrying layer is pivotable about said hinge means from a position in superposed and generally parallel relation to said photosensitive layer to a position wherein it is angularly disposed and spread apart from said photosensitive layer, said magazine having an exposure opening and means therein for urging said film unit into registration with said opening, said film unit being carried in said magazine so that the image-carrying layer thereof faces said exposure opening and said magazine also being provided with holding means releasably engageable with said image-carrying layer for holding said image-carrying layer in said superposed relation to said photosensitive layer, said image-carrying layer being releasable from said engagement with said holding means upon relative movement between said holding means and said film unit, said film unit also having associated therewith a rupturable container adapted to hold a photographic processing liquid and carried by said unit in a position to release its liquid content, upon rupture, between said photosensitive and image-carrying layers, said image-carrying layer comprising a flexible and deformable material and being shaped to a condition wherein at least a part thereof, beginning at the end of the image-carrying layer most distant from said hinge means, is overturned upon itself whereby said image-carrying layer is normally urged into its shaped condition and is yieldable under stress to be moved into said superposed relation with said photosensitive layer and, at least prior to rupture of said container, is capable of returning to its overturned condition upon release of said stress by release of said holding means.

15. A photographic product which comprises, in combination, a film magazine having mounted therein at least one film unit of the character comprising a photosensitive silver halide layer, an image-carrying layer, and hinge means connecting said photosensitive layer to said image-carrying layer adjacent one end of one of said layers whereby said image-carrying layer is pivtable about said hinge means from a position in superposed and generally parallel relation to said photosensitive layer to a position wherein it is angularly disposed and spread apart from said photosensitive layer, said magazine having an exposure opening and means therein for urging said film unit into registration with said opening, said film unit being carried in said magazine so that the image-carrying layer thereof faces said exposure opening and said magazine also being provided with holding means releasably engageable with said image-carrying layer for holding said image-carrying layer in said superposed relation to said photosensitive layer, said image-carrying layer being releasable from said engagement with said holding means upon relative movement between said holding means and said film unit, said film unit also having associated therewith a rupturable container adapted to hold a photographic processing liquid and carried by said unit in a position to release its liquid content, upon rupture, between said photosensitive and image-carrying layers, and said film unit being further provided with resilient means operatively engageable with a face of said photosensitive layer and a face of said image-carrying layer and urging said image-carrying layer into a position wherein it is angularly disposed and spread apart from said photosensitive layer.

16. A photographic product as defined in claim 15 wherein said resilient means is secured to the face of at least one of said layers by an adhesive material which is soluble in the liquid of said container.

17. A photographic product as defined in claim 15 wherein said resilient means have a frangible portion which is breakable upon the application of pressure thereto whereby said resilient means are rendered inoperative.

18. A photographic product as defined in claim 15 wherein said resilient means is constructed and arranged so that it is under compression when said image-carrying and photosensitive layers are in said superposed relation and so that it is rendered inoperative following the release of energy therefrom to effect movement of the image-carrying layer about its hinge means into a position wherein said photosensitive layer and said image-carrying layer are spread apart with respect to each other.

19. A photographic product as defined in claim 15 wherein said resilient means comprises a flat strip of spring material folded upon itself and positioned between said photosensitive layer and said image-carrying layer.

20. A photographic product as defined in claim 15 wherein said resilient means has a portion thereof which is soluble in said liquid.

21. A photographic product as defined in claim 15 wherein said resilient means includes locking means engageable with the resilient means when said resilient means is compressed for holding said resilient means in compressed condition.

22. A photographic product as defined in claim 15 wherein said resilient means is fixedly secured to said image-carrying layer and is located thereon for removal therefrom by cutting away the image-carrying layer adjacent thereto.

EDWIN H. LAND.

REFERENCES CITED

The following references are of record in the file of this patent:

UNITED STATES PATENTS

| Number | Name | Date |
| --- | --- | --- |
| 917,310 | Kelley et al. | Apr. 6, 1909 |
| 1,277,048 | De Brayer | Aug. 27, 1910 |
| 1,231,581 | Farmer | July 3, 1917 |
| 1,269,365 | Baker | June 11, 1918 |
| 1,826,695 | Favour | Oct. 6, 1931 |
| 2,059,900 | Parker | Nov. 3, 1936 |
| 2,125,536 | Baumgarten | Aug. 2, 1938 |
| 2,135,817 | Hughey | Nov. 8, 1938 |
| 2,172,257 | Parker | Sept. 5, 1939 |

(Other references on following page)

| Number | Name | Date |
|---|---|---|
| 2,211,498 | Files | Aug. 13, 1940 |
| 2,214,446 | Albers | Sept. 10, 1940 |
| 2,315,966 | Knott | Apr. 6, 1943 |
| 2,322,005 | Fierke et al. | June 15, 1943 |
| 2,322,006 | Fierke et al. | June 15, 1943 |
| 2,322,027 | Jelley | June 15, 1943 |
| 2,332,474 | Schusterman | Oct. 19, 1943 |
| 2,347,640 | Peters | May 2, 1944 |
| 2,352,014 | Rott | June 20, 1944 |
| 2,435,717 | Land | Feb. 10, 1948 |
| 2,495,111 | Land | Jan. 17, 1950 |
| 2,495,112 | Wolff | Jan. 17, 1950 |
| 2,495,113 | Gannon | Jan. 17, 1950 |
| 2,497,816 | Greenhalgh et al. | Feb. 14, 1950 |

FOREIGN PATENTS

| Number | Country | Date |
|---|---|---|
| 8,911 of 1905 | Great Britain | July 12, 1906 |
| 13,835 | Great Britain | 1907 |
| 370,821 | Germany | May 25, 1921 |
| 369,146 | Germany | Feb. 25, 1923 |
| 567,011 | Germany | Dec. 24, 1932 |
| 879,995 | France | Mar. 5, 1942 |